United States Patent
Benisty et al.

(10) Patent No.: US 9,892,032 B2
(45) Date of Patent: Feb. 13, 2018

(54) MANAGEMENT OF RANDOM CACHE READ OPERATIONS

(71) Applicants: Shay Benisty, Beer Sheva (IL); Tal Sharifie, Lehavim (IL); Yair Baram, Metar (IL)

(72) Inventors: Shay Benisty, Beer Sheva (IL); Tal Sharifie, Lehavim (IL); Yair Baram, Metar (IL)

(73) Assignee: SanDisk Technologies LLC, Plano, TX (US)

( * ) Notice: Subject to any disclaimer, the term of this patent is extended or adjusted under 35 U.S.C. 154(b) by 201 days.

(21) Appl. No.: 13/761,700

(22) Filed: Feb. 7, 2013

(65) Prior Publication Data

US 2014/0223073 A1 Aug. 7, 2014

(51) Int. Cl.
G06F 12/00 (2006.01)
G06F 12/02 (2006.01)
G06F 13/16 (2006.01)

(52) U.S. Cl.
CPC ...... *G06F 12/0246* (2013.01); *G06F 13/1689* (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 6,282,133 B1 * | 8/2001 | Nakagawa et al. | 365/194 |
| 6,956,787 B2 * | 10/2005 | Lisi et al. | 365/185.17 |
| 6,978,355 B2 * | 12/2005 | Mowery et al. | 711/167 |
| 7,474,587 B2 * | 1/2009 | Yoon | 365/230.08 |
| 8,634,241 B2 * | 1/2014 | Lee et al. | 365/185.09 |
| 2005/0240742 A1 * | 10/2005 | Eng et al. | 711/167 |
| 2006/0224820 A1 | 10/2006 | Cho et al. | |
| 2007/0086243 A1 | 4/2007 | Jo | |
| 2007/0165458 A1 * | 7/2007 | Leong | G06F 12/0893 365/185.12 |
| 2007/0189105 A1 | 8/2007 | Yoon | |
| 2008/0074933 A1 * | 3/2008 | Louie | G11C 7/1042 365/189.05 |
| 2012/0155173 A1 | 6/2012 | Lee et al. | |

* cited by examiner

*Primary Examiner* — Reginald Bragdon
*Assistant Examiner* — Michael Westbrook
(74) *Attorney, Agent, or Firm* — Brinks Gilson & Lione

(57) ABSTRACT

A method and system are disclosed that monitor and control random cache read operations. Random cache read operation may occur until the expiration of a timer. Upon expiration of the timer, the current random cache read sequence is terminated and new received read commands will not use this sequence. A flash controller may either use a page read operation or initiate a new random cache read sequence.

21 Claims, 7 Drawing Sheets

MANAGEMENT OF RANDOM CACHE READ OPERATIONS

TECHNICAL FIELD

This application relates generally to memory devices. More specifically, this application relates to monitoring and controlling random cache read operations in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. The flash controller receives commands, such as read commands, from a host. The commands may include admin (e.g. commands for device configuration and maintenance) as well as operation commands (e.g. commands for accessing the NAND media including erase, write and read commands). Since the timing and the order of those commands are unknown, they may be considered to be in a random sequence. Random cache read operation may only be implemented when the controller has many read commands waiting for execution. The controller then terminates random cache read operations when the command queue is empty. This functionality may decrease the system performance since the random cache read sequence may be terminated earlier than necessary. In some instances, the host may send new read commands at that time. Those new commands may not use the previous random cache read sequence.

SUMMARY

Efficient management of random cache read operations may improve the performance of read commands in flash memory devices. An algorithm may implement an improvement in the usage of a random cache read operation by utilizing a timer that can stop the waiting for additional read commands when the timer has expired. The timer algorithm allows for random cache read operations to continue even when the read command queue is empty. The flash memory may utilize random cache read operations until the timer expires. Upon expiration of the timer, the current random cache read sequence is terminated and new received read commands will not use this sequence. The flash controller will either use a page read operation or initiate a new random cache read sequence. A timer may be used after each sense for each read operation to trigger random cache read operation. Expiration of the timer before receipt of another read operation will result in implementation of the last transfer operation rather than continuing with additional sense operations through random cache read.

DESCRIPTION OF THE PRESENTLY PREFERRED EMBODIMENTS

Figure 1:
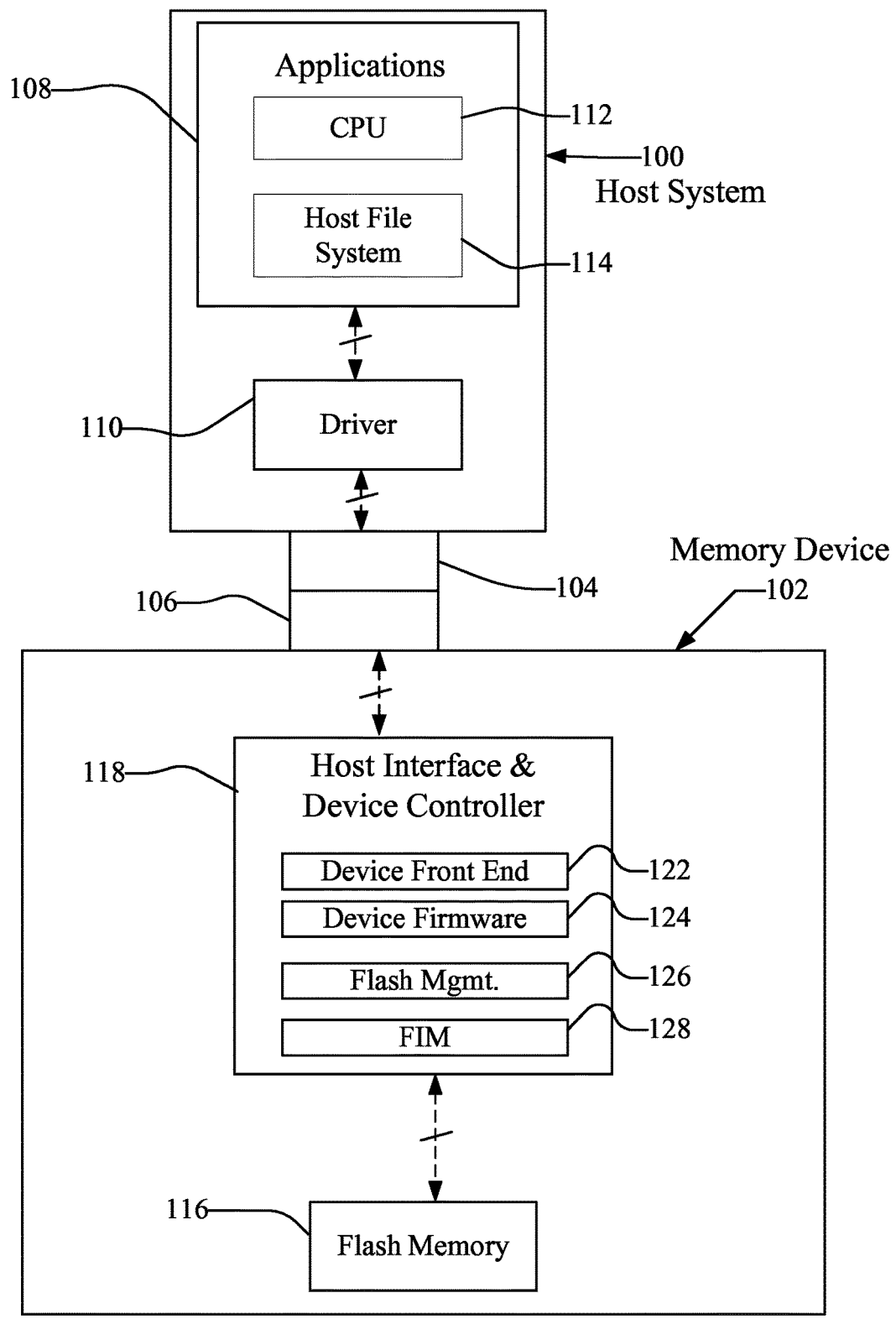
FIG. 1 is a block diagram of a host connected with a memory system having non-volatile memory.
Figure 2:
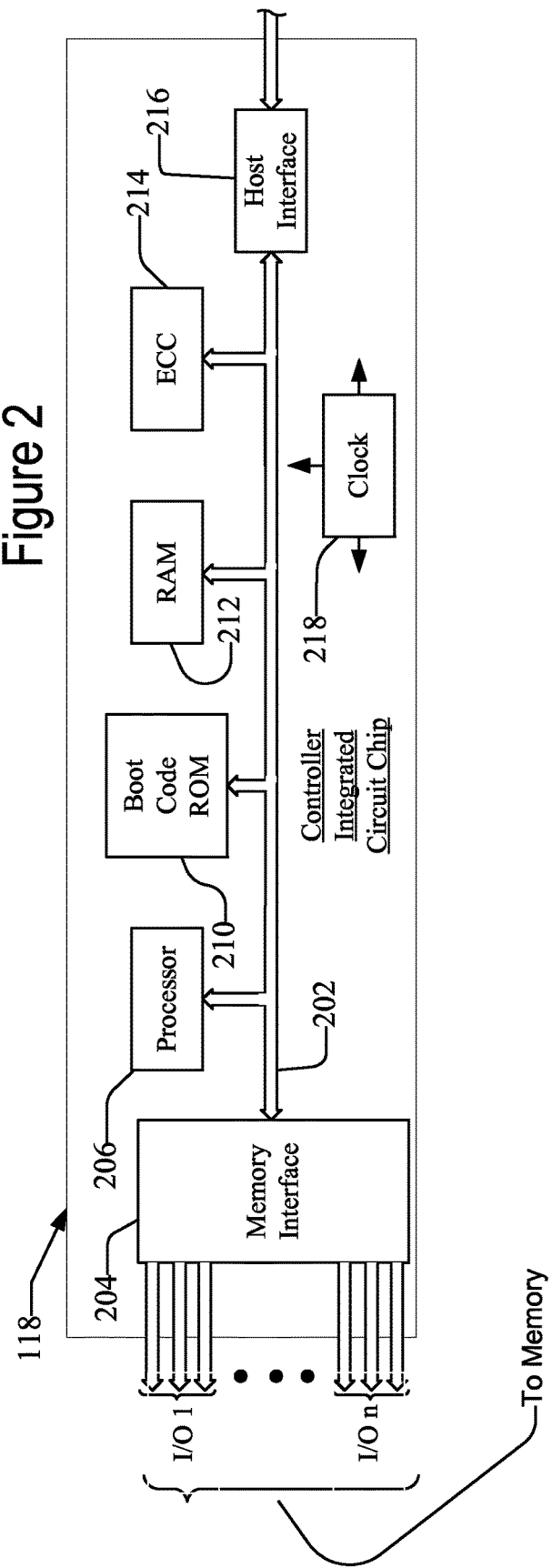
FIG. 2 is a block diagram of an exemplary flash memory system controller for use in the system of FIG. 1.
Figure 3:
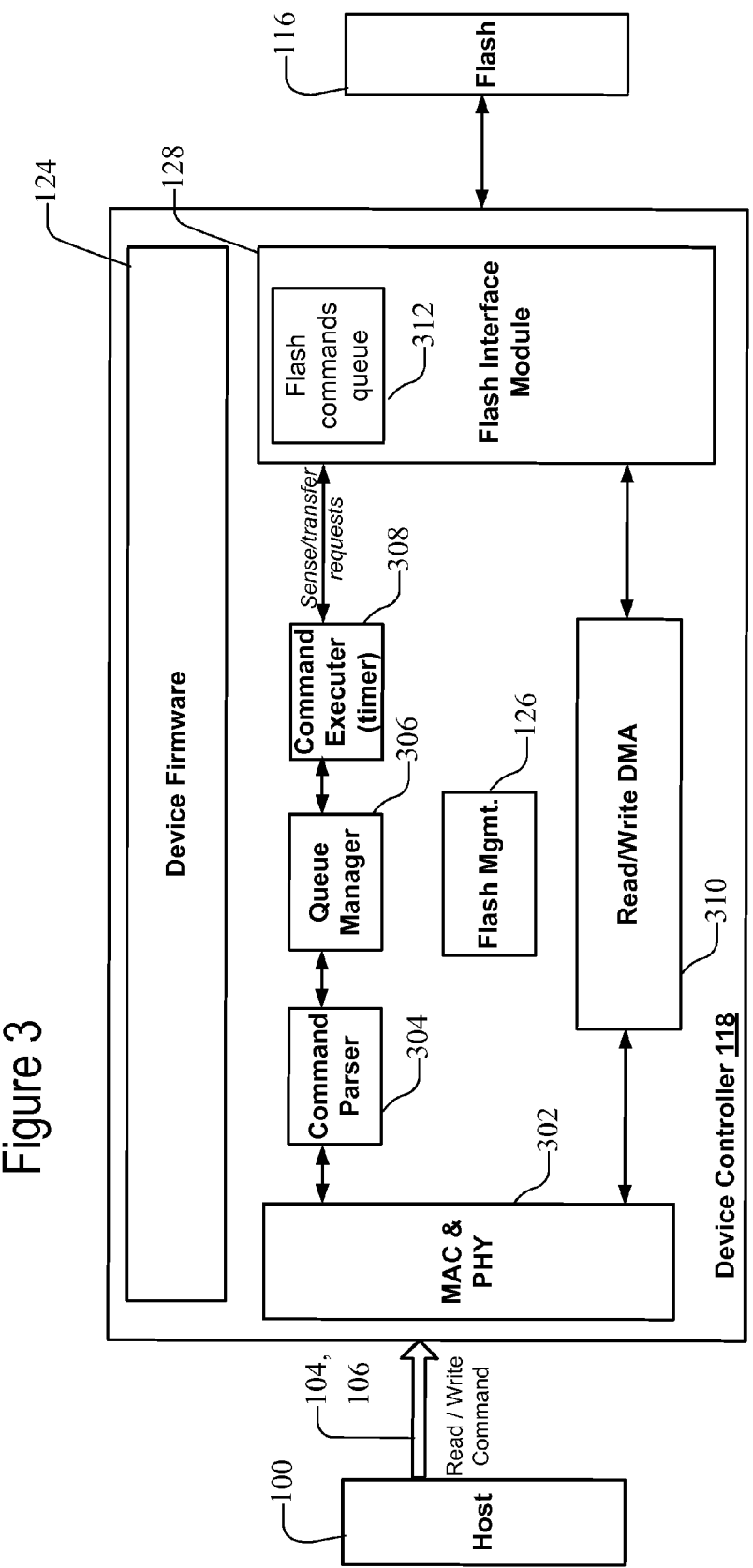
FIG. 3 is a block diagram of a flash controller.

A flash memory system suitable for use in implementing aspects of the invention is shown in FIGS. 1-3. A host system 100 of FIG. 1 stores data into and retrieves data from a flash memory system 102. The flash memory may be embedded within the host, such as in the form of a solid state disk (SSD) drive installed in a personal computer. Alternatively, the memory system 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory device 102 is concerned, made up of a combination of circuitry and software. An applications portion 108 and/or a driver portion 110 may interface with the memory device 102. There may be a central processing unit (CPU) 112 and a host file system 114 implemented in hardware and the driver is implemented by firmware. In a PC, for example, the applications portion 108 is implemented in hardware that may include a processor 112 for running word processing, graphics, control or other popular application software. In a camera, cellular telephone or other host file system 114 that is primarily dedicated to performing a single set of functions, the applications portion 108 may be implemented in hardware for running the software that operates the camera to take and store pictures, the cellular telephone to make and receive calls, and the like.

The memory device 102 of FIG. 1 may include non-volatile memory, such as flash memory 116, and a device controller 118 that both interfaces with the host 100 to which the memory device 102 is connected for passing data back and forth and controls the memory 116. The device controller 118 may convert between logical addresses of data used by the host 100 and physical addresses of the flash memory 116 during data programming and reading.

The host system 100 may be referred to as a front end, while the flash memory 116 may be referred to as a back end. The device controller 118 interfaces with both the front end (host 100) and the back end (memory 116). Functionally, the device controller 118 may include a device front end 122 that interfaces with the host system, device firmware 124 for coordinating operation of the memory 116, and flash management logic 126 for internal memory management operations. There may also be one or more flash interface modules (FIMs) 128 or memory interfaces to provide a communication interface between the controller with the flash memory 116. FIG. 3 illustrates additional components that may be a part of the memory device.

The device controller 118 may be implemented on a single integrated circuit chip, such as an application specific integrated circuit (ASIC) such as shown in FIG. 2. The processor 206 of the device controller 118 may be configured as a multi-thread processor capable of communicating via a memory interface 204 having I/O ports for each memory bank in the flash memory 116. The device controller 118 may include an internal clock 218. The processor 206 communicates with an error correction code (ECC) module 214, a RAM buffer 212, a host interface 216, and boot code ROM 210 via an internal data bus 202. The RAM 212 may be a static random-access memory ("SRAM"). The ROM 210 may be used to initialize a memory device 102, such as a flash memory device. The memory device 102 that is initialized may be referred to as a card. The host interface 216 may provide the data connection with the host.

The memory interface 204 may be one or more FIMs 128 from FIG. 1. The memory interface 204 allows the device controller 118 to communicate with the flash memory 116.

FIG. 3 may be a portion of FIG. 1 or may illustrate an alternative embodiment. FIG. 3 illustrates an alternative embodiment of the device controller 118, its internal block and their interactions. The host 100 sends commands to the device controller 118 using a physical interface 104, 106 which connects the host to the memory device 102. There are many protocols defined in the industry for this interface such as PCI express, SATA and etc. For purposes of this application, any interface or any protocol may be implemented. The MAC and PHY 302 implement three low protocol layers (Transaction layer, Data Link layer and physical layer). The responsibility for the MAC and PHY 302 may be to make sure that packets are transferred between the host 100 and the memory device 102 without the errors defined in those layers. The command parser 304 receives the operation as well as the admin Host commands, parses them and checks the correctness of the host commands. It may interact with the queue manager 306 in order to queue the commands to the appropriate queue. Before executions, host commands may be pending in the queue manager 306. There may be many queues for difference purposes. The flash management 126 may be responsible for internal memory management operations such as address translation. Command executer 308 may be responsible for command selection and execution and may arbitrate between the pending commands, select the next executed command and execute it by sending sense and transfer requests to the flash interface module ("FIM") 128. In one embodiment, the FIM 128 may include a flash command queue 312 for holding the last sense and transfer requests received from the command executer 308. FIM 128 interacts with the flash memory 116 by sending flash commands.

The device controller may include a read/write direct memory access ("DMA") 310 which may be responsible for transferring data between the host and the device. The command parser 304, queue manager 306, flash management 126 and command executer 308 may be responsible for handling the control path in the device, while the read/write DMA 310 handles the data path in the device. Device firmware 124 may control and manage the functionality of this logic. At the initialization phase, the firmware may configure the device controller 118. During operation, the firmware 124 controls the logic and manages the flash memory 116.

In one embodiment, command executer 308 may queue sense and transfer requests to the flash commands queue 312. FIM 128 may use this information for sending commands to the flash memory 116. The sense/transfer requests may include other parameters that assist FIM 128. For example, sense requests may include the flash address while transfer requests may include the amount of data to be read from the flash memory 116.

The command executer 308 includes a timer or timer functionality. The timer is implemented such that random cache read operation is used until the timer expires for each read operation as further described below with respect to FIG. 7. FIG. 5 and its description further describe random cache read operation. Even when the queue manager 306 does not include any host commands (i.e., the queue is empty), the random cache read operation can continue until the timer has expired. The timer may be configurable for performance optimization. For the first sense command in a random cache flow and for every command during a random cache flow, the logic initiates and activates this timer. The logic does not terminate the current sequence unless the value of this timer becomes zero. The initial value of this timer can be configured by firmware for fine tuning, but its default value may be the read access time as discussed below with respect to FIGS. 4 and 5.

Figure 4:
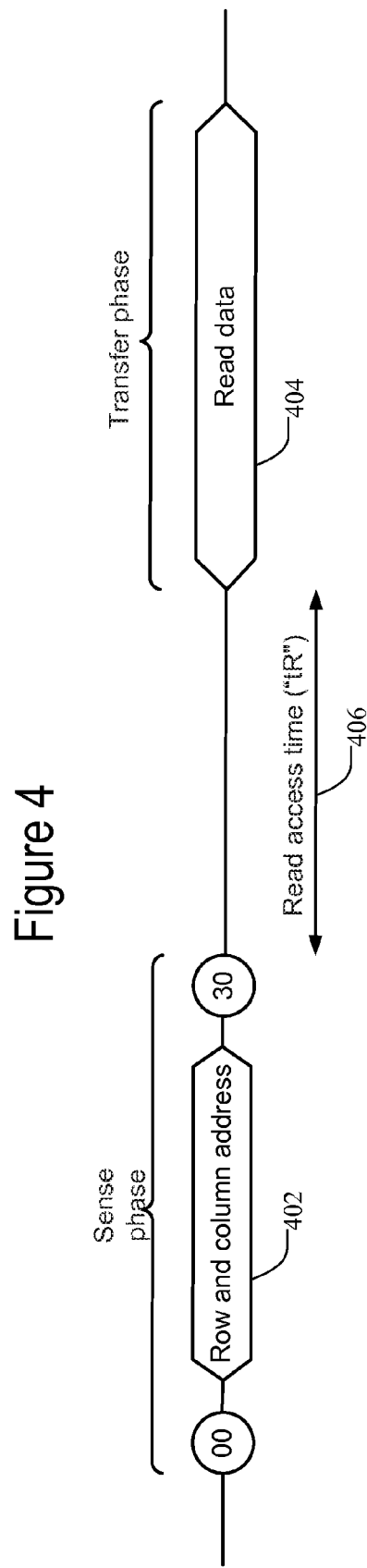
FIG. 4 is a timing diagram of page read operation.
Figure 5:
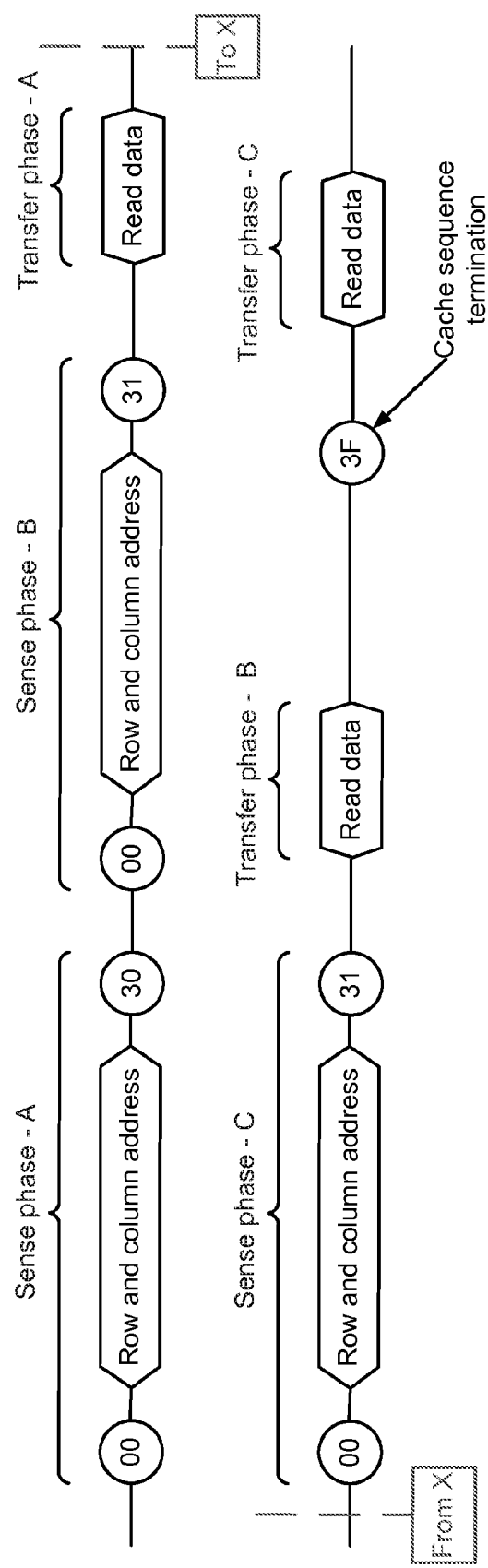
FIG. 5 is a timing diagram of random cache read operation.

FIG. 4 is a timing diagram of page read operation. A page read operation includes a sense phase and a transfer phase for each read. The sense phase includes an identification of the row and column address 402. In particular, the flash interface provides the row and column address, then it waits the read access time (tR) 406 before the data is read 404 for the transfer phase. The read access time tR is the time between when the row and column address are known until the data is actually read. It may be an amount of time that it takes the system to prepare the data and may be defined in the flash specification with a base number and a worst case number.

In NAND flash memory embodiments, there may be eight I/O pins. Command, address, and data may all be written through those I/O pins. There are many commands supported by the flash and each command may start by driving a special code on the I/O interface and may end by driving another special code on that interface. For example, the page read operation may start with the host controller driving 00 on the I/O path, and then provide the row and the column address and finally terminating the command by driving 30 on this path. The 00 represents the starting special code of page read command. Next, the device controller drives the row and the column address. Finally, the device controller ends the command by driving the 30 special code on that interface.

As described below with respect to FIG. 5, a second sense operation may occur after the read access time (tR) but before the first transfer operation occurs. The second sense may be sent after the tR time but then the transfer operation associated with the first page may start almost immediately such that the busy time is less than tR.

As shown, FIGS. 4 and 5 are not to scale and the timing for the sense or transfer phases may be different. For example, the transfer phase may be much longer than the sense phase in one embodiment although that distinction is not illustrated in FIGS. 4 and 5.

FIG. 5 is a timing diagram of random cache read operation. There are three read operations (A,B,C) illustrated in FIG. 5, each of which includes a sense phase and a transfer phase. For read operation A, the sense phase occurs first. After the read access time (tR) (not shown in FIG. 5), the sense phase for read operation B occurs. Following the sense phase B, the transfer phase of operation A occurs almost immediately. During the transfer of block A, the flash prepares the data that is associated with sense B and stores it in the cache buffer. The sense phase for operation C is received and during the read access time of read operation C, the transfer phase of read operation B occurs followed by the transfer phase of operation C. Random cache read operation processes multiple read commands together. FIG. 4 illustrates a page read operation that includes: Sense Phase A, tR, Transfer Phase A. FIG. 5 illustrates a random cache read operation that includes: Sense Phase A, Sense Phase B, Transfer Phase A, Sense Phase C, Transfer Phase B, and Transfer Phase C. Accordingly, random cache read operation receives multiple senses from different read operations consecutively to maximize the processing of commands within a certain time frame. Additional sense operations may occur between a sense phase and transfer phase of a particular read command.

In one embodiment, random cache read command starts off by driving 00 on the flash interface. Then, the device controller may drive the row and the column address. Finally, the command ends up by driving 31 for one hardware cycle on the 8 I/O pins. 3F represents the Read Start for Last Page Cache Read command. In other words, by driving 3F on the 8 I/O pins, the device controller terminates the current read cache sequence. Following this command, the flash may transfer the last page associated with this sequence.

Figure 6:
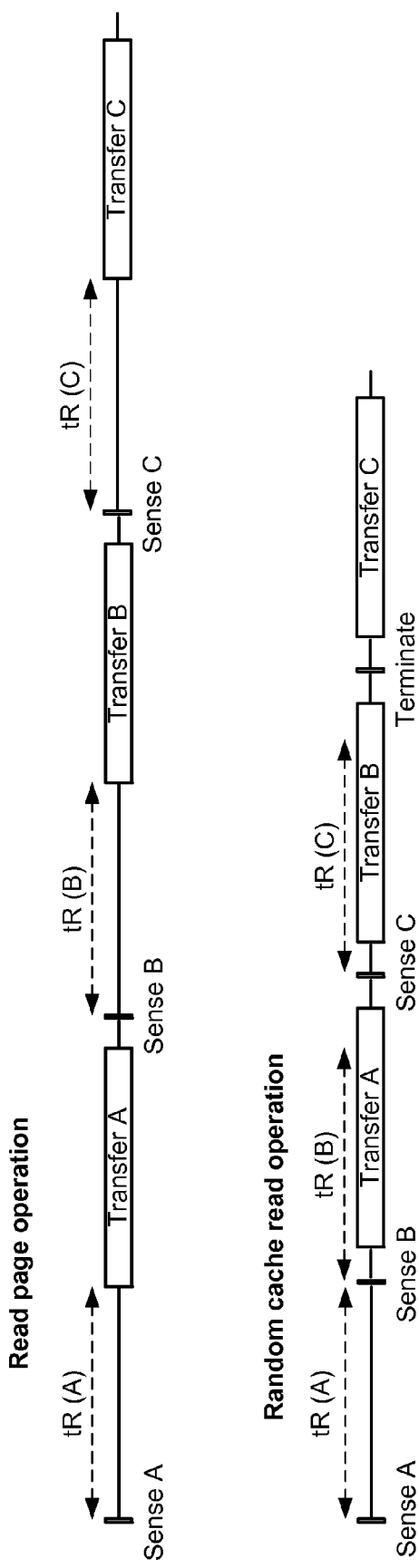
FIG. 6 is a timing diagram of page read operation and random cache read operation.

FIG. 6 illustrates the performance boost that may be achieved when using the random cache read sequence. In one example, the sense phase may consume seven hardware cycles while the read access time and the actual transfer may consume many cycles. When using read page operation, the device controller may wait the read access time before any transfer. During that time the flash memory is busy and no commands can be sent to the flash. When using the random cache read operation, the read access time (tR) is interleaved with the transfer of the previous block. This may increase the system performance. The example in FIG. 6 illustrates only three transfers but the more transfers in a random cache read sequence, the greater the potential boost in performance.

Random cache read operation may use a cache buffer that is implemented in the flash to increase the performance. In this operation, the next row and column address is provided before transferring the current read data. The random cache read operation may not improve efficiency if there is only a single command. Waiting until the queue manager 306 no longer includes any pending commands to switch from random cache read operation to page read operation may be inefficient. In other words, all the commands that are currently queued in the queue manager 306 may be executed and when the queue is empty, the random cache read operation may be terminated. Indeed, this may increase the system performance compared to the page read operation to achieve better performance. However, utilizing the timer algorithm discussed herein achieves even better performance. On the other hand, leaving the random cache read sequence for a long time waiting for a new host command may not be efficient. In this state, performance may be lost since the data associated with the previous page might be ready in the flash buffer but it cannot be transferred. Accordingly, a timer may be implemented during the read access time that waits for additional commands and does not terminate the current random cache read operation until after expiration of the timer. This may maximize the number of commands that can be executed together in the same random cache read operation without losing performance.

In one embodiment, the timer may be set to be slightly less than the read access time tR. The timer may be set and/or controlled by the firmware. The algorithm and use of the timer may be disabled by configuring the timer to zero in which case, the algorithm behaves the same except the timer expires immediately. The firmware may further adjust the length of the timer for optimal performance.

There may be two cases in which the timer is initiated and activated. The first activation may be for a first entry in the random cache read sequence. Another activation may be for all other entries. Firmware may configure the default value for the timer for both activations using different configuration registers. For example, for configuration for an activation by a first entry in the random cache read sequence there may be a configurable register that holds the initial value for this timer. When the hardware activates this timer, it may copy this value to the timer and activate it. The default value of this register may be the read access time tR. For configuration of other entries, there may be two different configuration registers that assist hardware to configure the timer. Firmware may configure a fixed value for this timer and a value that depends on the amount of data that is transferred.

The time that passes between generating the previous transfer phase to the next sense or last transfer phase may depend on the size of the current transfer. The initial value of the timer for the first activation (of a first entry in the random cache read sequence) may not depend on the transfer size. Conversely, the initial value of the timer for the second activation of other entries may depend on the transfer size.

The sense phase of page B may be started at least tR after sense A. This time may not depend on any transfer size. When the FIM 128 cannot do anything with the generated sense/transfer request during a specific time, there may be no need to generate it at the current time. Rather, the generation may be when the FIM 128 is able to use this information. In this case, instead of generating the transfer request for page A, there is a wait for the tR time. During that time, the queue may contain more commands and the random cache read operation may be used. For other entries, the optimal value for the timer might depend on size of the current transfer. For example, when the size of the current transfer is greater than tR, the current transfer time may be the wait time rather than waiting the tR time. This operation may increase the system performance since more commands are used in one random cache read sequence.

In one embodiment, hardware may calculate an initial value for the timer. For the first activation, the initial value does not depend on the width of the transfer and therefore firmware configures only the base value and that would be the initial value of the timer. For the second activation, since this time might depend on the transfer width, the initial value of the timer may be more flexible. The equation for this example may be: <Timer Initial Value>=<Timer Base Value>+<Current Transfer Size in 4 KB>*<Timer Delay for each 4 KB>. The Timer Base Value and Timer Delay for each 4 KB may be configurable by firmware. 4 kilobytes (KB) is shown as a transfer size, which in this case may be the smallest transfer size; however, other sizes are possible in other embodiments.

Figure 7:
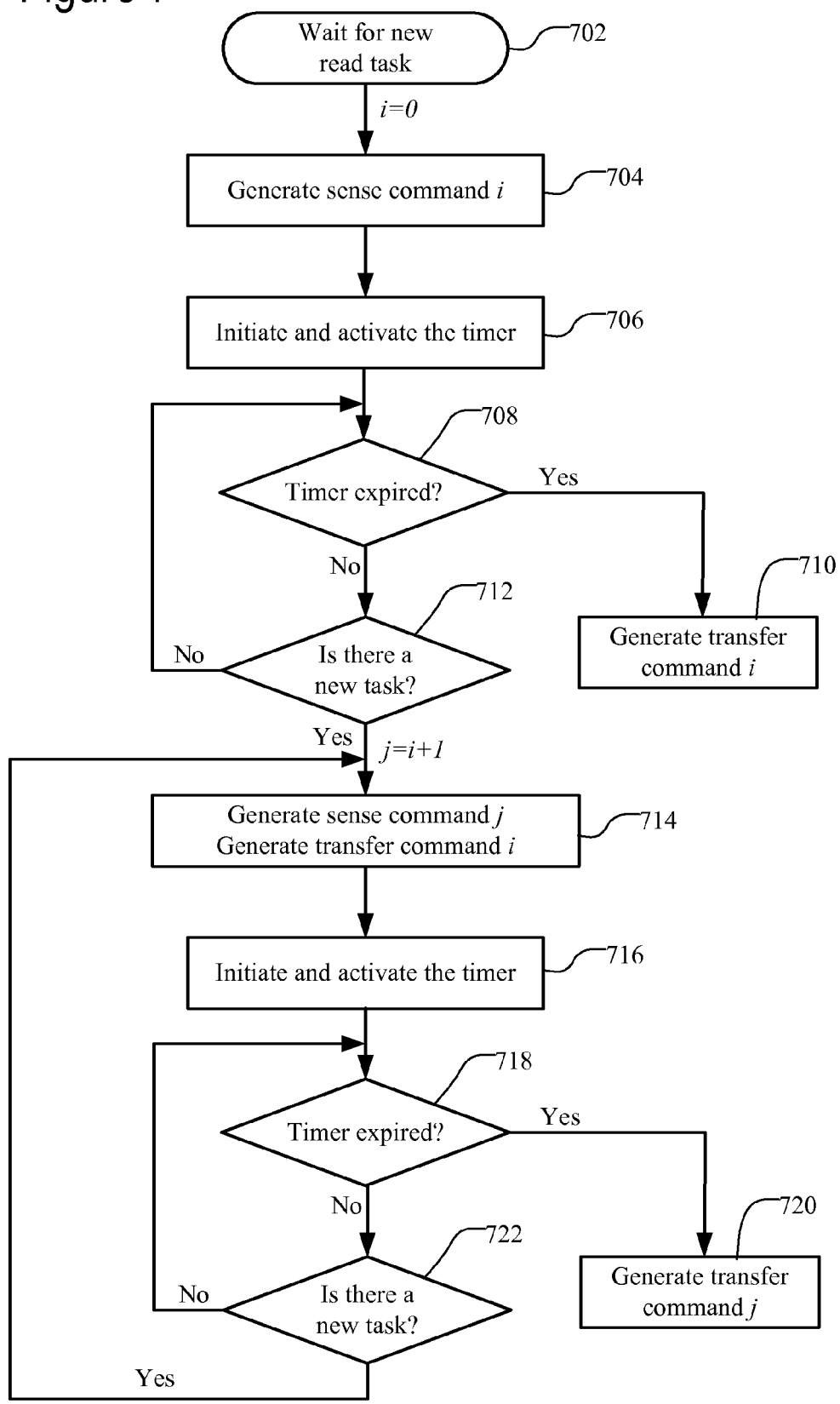
FIG. 7 is a flow chart illustrating an algorithm for handling random cache read operation.

FIG. 7 is a flow chart illustrating an algorithm for handling random cache read operation. The command executor 308 may store and/or execute the algorithm shown in FIG. 7. The timer in the algorithm may be part of the command executer 308. In block 702, the system waits until the queue manager 306 includes a new read command or task from the host. A sense command i (i=0) is generated by the command executor 308 and received by the FIM 128 at in block 704. Upon receipt of the sense command i (i=0), the timer is initiated and activated in block 706. In block 708, the timer is checked for expiration. When the timer has expired, the transfer command i is generated in block 710. In this state, the logic may not use the random cache read operation since it has only one read command and the data has already ready for transfer. Therefore, there may be no need for random cache read operation for this scenario. If the timer has not expired, the system can wait for a new task in block 712 until the timer expires. If a new task is received (new task j=i+1), a sense command for the new task (sense command j) is generated in block 714. In other words, the logic initiates a random cache read operation by generating a sense command for the new task (sense command j) in block 714. Block 714 also illustrates that the transfer command i for the first task may be generated. The transfer command i may be generated after the sense command j in block 714. Upon generation of the next sense command (sense command j), the timer is again initiated and activated in block 716. In block 718, the timer is monitored for expiration. When the timer has expired in block 718, the last transfer command j is generated in block 720. The current random cache read sequence may be terminated by generating the last transfer command j in block 720. If the timer has not expired and there is a new task in block 722, the algorithm returns to block 714 for the next command. If the timer has not expired and there is not a new task in block 722, the algorithm waits for timer expiration in block 718.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for command operation management comprising:
in a memory system having blocks stored in non-volatile storage and a controller in communication with the non-volatile storage, the controller is configured for:
receiving a first page read operation that comprises a sense phase and a transfer phase, wherein the sense phase occurs first and at least a read access time follows before the transfer phase;
implementing a timer wherein a second sense phase from a second page read operation occurs unless the timer has expired, wherein a value of the timer depends on a transfer size for a pending transfer phase;
executing a random cache read operation before the timer expires that includes executing the transfer phase from the first page read operation after the second sense phase; and
executing a page read operation when the timer expires before the second sense phase that includes executing the transfer phase from the first page read operation before the second sense phase.

2. The method of claim 1 wherein the receiving by the controller is from a host.

3. The method of claim 1 wherein the timer is configurable.

4. The method of claim 3 wherein the timer is optimized during page read operations.

5. The method of claim 4 wherein the timer is initially set as the read access time.

6. The method of claim 3 wherein firmware for the memory system can fine tune the timer.

7. The method of claim 3 wherein the timer can be disabled by setting its value to zero.

8. The method of claim 1 further comprising:
implementing, after the second sense phase, the timer wherein a third sense phase from a third page read operation occurs unless the timer has expired; and
executing the transfer phase from the second page read operation after the third sense phase, or when the timer expires before the third sense phase the transfer phase from the second page read operation is executed before the third sense phase.

9. The method of claim 1 wherein the random cache read operation continues even when a queue of read operations is empty and until the timer expires, further wherein the random cache read operation includes waiting for a next page read operation before conducting a transfer operation.

10. The method of claim 9 wherein the random cache read operation is terminated upon expiration of the timer, further wherein expiration of the timer before receipt of another read operation will result in implementation of the transfer operation.

11. A memory system comprising:
a non-volatile storage having an array of memory blocks storing data that is associated with logical block addresses (LBAs); and
a controller in communication with the blocks, the controller configured to:
receive a first page read operation that includes a first sense command and a first transfer command;
activate a timer during which a random cache read operation is used for handling subsequent commands, wherein expiration of the timer before receipt of one of the subsequent commands stops the random cache read operation and implements a page read operation;
generate, when the timer has not expired and the random cache read operation continues, a second sense command from a second page read operation; and
generate, when the timer has expired before receipt of the second sense command, the first transfer command from the first page read operation as part of the page read operation.

12. The memory system of claim 11 wherein the memory system comprises a flash memory or a solid state memory.

13. The memory system of claim 11 further comprising:
activate the timer upon receipt of the second sense command; and
generate, when the timer has not expired, a third sense command from a third page read operation, or generate, when the timer has expired, a second transfer command from the second page read operation.

14. The memory system of claim 11 wherein the timer is configurable.

15. The memory system of claim 14 wherein the timer is optimized during page read operations.

16. The memory system of claim 15 wherein the timer is initially set as the read access time before being optimized.

17. The memory system of claim 11 wherein the random cache read operation is only terminated upon expiration of the timer even when a queue of read operations is empty, further wherein expiration of the timer before receipt of another read operation will result in implementation of the transfer operation.

18. A method for operating a memory system comprising:
in a non-volatile storage device having a controller and blocks of memory, the controller is configured for:
receiving a first page read operation;
executing a first sense phase from the first page read operation;
initiating a timer;
executing a second sense command before executing a first transfer command from the first page read operation when a second page read operation is received before expiration of the timer; and
executing, when the timer has expired before receipt of the second sense command, a first transfer command from the first page read operation before executing a second page read operation.

19. The method of claim 18 wherein random cache read operation is maintained as long as the timer has not expired and even when a queue of read operations is empty.

20. The method of claim 19 wherein random cache read operation is stopped after the timer has expired.

21. A method for operating a memory system comprising:
in a non-volatile storage device having a controller and blocks of memory, the controller is configured for:
implementing random cache read operations for executing multiple sense phases from multiple page read operations before executing corresponding transfer phases;
continuing the random cache read operations even when there are no pending page read operations; and
stopping random cache read operations and switching to page read operations, upon expiration of a timer that starts after each sense phase when there are no pending page read operations.

* * * * *